Jan. 9, 1945.　　　　　E. J. GAIR　　　　　2,366,962
NONSPLITTING NAIL
Filed Oct. 13, 1942

Inventor
Ernest J. Gair
By [signature]
Attorney

Patented Jan. 9, 1945

2,366,962

UNITED STATES PATENT OFFICE 2,366,962

NONSPLITTING NAIL

Ernest J. Gair, Snyder, N. Y.

Application October 13, 1942, Serial No. 461,853

2 Claims. (Cl. 85—30)

This invention relates to a non-splitting nail.

It is well known that the nails now in use will split pine and hardwood particularly when used in moldings made of these woods. Splitting of these woods as well as other woods also occurs on thin molding strips used on screens and many other kinds of fine woodwork including the tongues and grooves of hardwood flooring.

The nail made by the present invention eliminates splitting of all types of wood and similar materials in which nails are used, particularly pine and all hardwoods used for moldings, finishing strips on screens, and the tongue and groove structures of hardwood floors and other similar woodwork. The invention also provides a nail that not only eliminates splitting, but effectively secures the parts together through frictional engagement in the wood parts in which it is driven, provides for the elimination of many different sizes of nails so that the number of different sizes can be reduced for various types of woodwork and the like, and provides a nail that bites in and takes hold at the beginning of the driving operation upon the first blow of the hammer. The nail of the present invention will bite and hold in the wood even though given a glancing blow at the beginning and thereby eliminate for the most part the tendency of nails to rebound in many instances upon striking the first blows on the heads thereof.

The invention further contemplates the provision of a nail that may be readily manufactured in an economical manner. Other features are hereinafter referred to.

Figure 1:
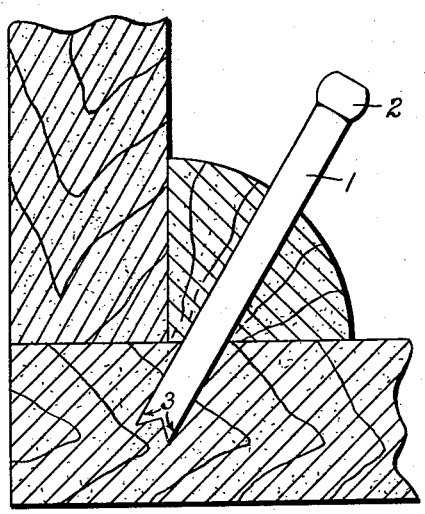
Fig. 1 is a cross section showing a nail partly driven into position for securing a piece of molding to adjacent woodwork.

The nail formed of the present invention has a shank 1 that is shown as being of cylindrical form although it may be of other shapes such as polygonal. Shank 1 is formed to have a uniform cross section throughout its length in order that all portions of the shank will be of substantially uniform size. A conventional head 2 is formed on one end. A finishing head type of nail is illustrated in the drawing. It is to be understood, however, that a flat head or any other form of head commonly used on various types of nails may be used on a nail embodying the present invention at one end of the shank 1 in the position of head 2.

The opposite extremity of shank 1 is formed to provide a driving end generally illustrated by the numeral 3. This driving end is formed to provide a pair of driving points 4 in spaced relation at diametrically opposite points of the periphery of shank 1. The driving points 4 lie in the peripheral portion of shank 1 so as to be coextensive therewith. These points 4 are formed by a pair of flat end faces 5 that are arranged in substantially perpendicular relation to each other.

Figures 3, 4:
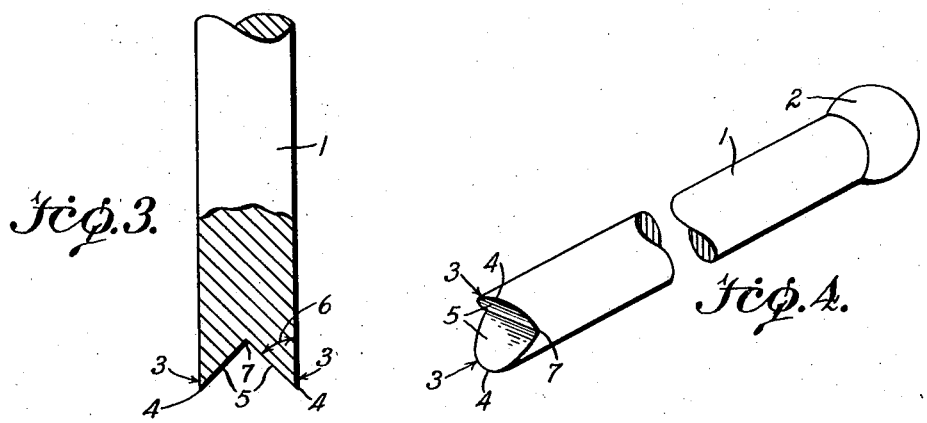
Fig. 3 is a longitudinal cross section through the driving end of the nail showing a portion thereof in substantially enlarged transverse cross section.
Fig. 4 is a substantially enlarged fragmentary view showing the nail in perspective.
Figure 5:
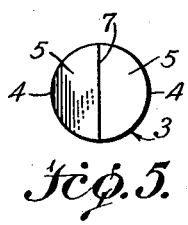
Fig. 5 is a substantially enlarged end view of the driving end.

End faces 5 intersect in perpendicular relation in the plane of the axis of shank 1 and are inclined in relation to the axis of shank 1 so that the included angle between the periphery and each face 5 indicated in Fig. 3 at 6 forms an acute angle so that the edge formed by the inner section of each face 5 with the periphery of shank 1 will form a sharp cutting edge at the driving points 4. Intermediate these driving points the angular relation to the periphery of shank 1 changes until the portion at the intersection of faces 5, indicated at 7, is in substantially right angular relation to the surface of shank 1. However, a cutting or shearing action will be obtained entirely around the periphery of shank 1 where it intersects within faces 5 on the driving end 3 of the nail.

Included angle 6 as illustrated in Fig. 3 is indicated as extending between a line joining the axis of the nail and a point 4 at the periphery. This is the portion that has the acute angle of smallest degree so that the sharpest edge on the nail is at diametrically opposite points indicated by the numeral 4 to form a pair or plurality of spaced driving points equally spaced about the periphery of the shank on the driving end of the nail.

Figure 2:
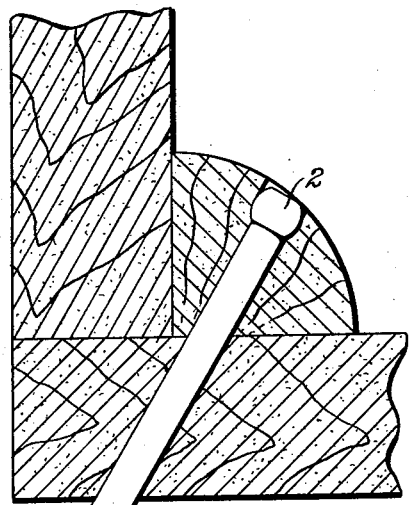
Fig. 2 is a view similar to Fig. 1, showing a nail fully driven into position illustrating how it may project through woodwork and remove some of the material by displacement through the operation of its cutting end.

The angular relation of the end faces 5 provide a structure whereby the driving points 4 of the nail are not bendable and, therefore, when driven into wood or other similar substances in the normal use of the nail for securing two or more pieces of wood or the like together these points will not bend or flex outwardly. The edges formed about points 4 and the periphery of shank 1 at the driving end of the nail by the intersection of faces 5 with the periphery of the shank 1 will form cutting edges. When the nail is driven through a piece of wood or other similar material it will cut the fibers of the wood and drive them through the portion of the wood subsequently forming the bore occupied by the nail. If the nail penetrates entirely through the wood, as illustrated in Fig. 2, this cut fiber is displaced by the nail in being driven through the wood. The nail displaces the cut and compressed fibers from the wood beyond the end of the nail. In many instances this displaced fiber material in its highly compressed condition will adhere to the end of the nail as indicated at 8 in Fig. 2. By providing a nail of substantially uniform cross sectional structure throughout the shank with the end faces 5 forming the driving points 4 in the manner indicated, the nail in cutting the fibers for the portion of the wood which the nail displaces, removes the portion of the wood to a substantial extent in this cutting action so that when the nail is driven home it will not only frictionally adhere and stick in the wood to secure the pieces together in the usual manner, but will not split thin pieces of molding or thin strips of wood even though they may be formed of pine or hardwood. Larger nails than usual, constructed in accordance with the disclosure of this invention can be used in thin strips for securing them to other pieces of wood without splitting. The nail of the present invention forms its own hole in being driven into the hole and does not require drilling of the nail hole in the molding prior to driving the nail.

The nail of the present invention will bite in and take hold in the wood at the first hammer blow even though it may be struck a slightly glancing blow. This enables nails to be readily driven because as soon as they take hold it is not necessary to hold the nail during further preliminary driving operation with a hammer as is customary with nails now in common use.

It will be noted that there is no wedge-shape at the end of the shank in the present invention. Splitting action is thus avoided to a large extent while the two points illustrated in diametrically opposite relation with the inclined end faces 5 of uniform structure give a balancing and stabilizing action to the nail while being driven so that it will drive straight into the wood without bending and twisting during its cutting action. A nail constructed in accordance with the invention as above described drives easily into the wood because of its cutting action on the fibers which at the same time eliminate the splitting action common with other nail structures.

The nail of the present invention is very desirable for use as a finishing nail with the usual finishing head thereon in attaching moldings of all types both in building structures in inside finishing work, in furniture structure where small moldings are attached in order to add to the decorative effect about the exterior portions of the furniture. These nails are particularly adapted for use on screens in attaching the small moldings about the edge of the screen wire and for all other fine woodwork where thin small strips are used for attachment to the remainder of the wood structure in attaching the finishing pieces.

Nails constructed in accordance with the present invention work very well with thin hardwood floors of the tongue and groove type because they will not split the tongues and grooves in being driven into the edges of the thin hardwood strips in securing them to the sub-flooring. Heavier nails can be used with the present invention than those customarily used because of the non-splitting structure and also avoid bending of the nail.

The usual injuries caused by nails being projected away from the place of driving upon the first blows by hammers through hitting the heads of the nails a glancing blow is substantially eliminated with the nail of the present invention because the points 4 have a biting action into the wood upon the first hammer blows of a character that substantially eliminates the projection of these nails away from the place of driving.

The nails of the present invention bind and hold in position without splitting of any character and are highly economical to manufacture due to the particular structure of end faces 5 being arranged in substantially perpendicular intersecting relation in a manner that they extend through the periphery of shank 1 at opposite sides thereof between points 4 in a manner that they may be readily made by a die stamping operation in the formation of the nail from wire stock. These nails may be made in all sizes and are particularly adapted to the smaller sizes for use in securing molding and other similar small strips in position.

The invention claimed is:

1. A non-splitting nail, comprising a shank of uniform size formed at one end to provide a pair of spaced driving points at diametrically opposite sides of the terminal of said shank and at the outer periphery thereof, said end having a pair of flat end faces extending inwardly in inclined relation and intersecting in substantially perpendicular relation to form a V-shaped groove extending transversely across the end of said shank between said points, said end faces forming cutting edges on the extremity of said shank at the intersection thereof with the periphery of said shank.

2. A non-splitting nail, comprising a shank having a substantially uniform cross sectional size between opposite extremities, one extremity being formed to provide a driving end having a sharp cutting edge only about the periphery of said extremity formed by the outer surface of said shank and angular end faces intersecting in substantially perpendicular relation at the axis of said shank and in acute angular relation with the outer periphery of said shank, and said driving end having a transverse groove extending entirely across the end of said shank, said groove being formed by said end faces.

ERNEST J. GAIR.